(12) United States Patent
Pouyau et al.

(10) Patent No.: US 10,316,747 B2
(45) Date of Patent: Jun. 11, 2019

(54) AIRCRAFT TURBINE ENGINE AIR INTAKE DUCT

(71) Applicant: SAFRAN AIRCRAFT ENGINES, Paris (FR)

(72) Inventors: Guillaume Rodolphe Jacques Gérard Pouyau, Paris (FR); Romeo Brogna, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 63 days.

(21) Appl. No.: 15/353,185

(22) Filed: Nov. 16, 2016

(65) Prior Publication Data

US 2017/0138261 A1    May 18, 2017

(30) Foreign Application Priority Data

Nov. 17, 2015  (FR) ..................... 15 61029

(51) Int. Cl.
*F02C 7/04* (2006.01)
*B64D 27/10* (2006.01)
(Continued)

(52) U.S. Cl.
CPC ............... *F02C 7/04* (2013.01); *B64D 27/10* (2013.01); *B64D 33/02* (2013.01); *F02C 7/045* (2013.01);
(Continued)

(58) Field of Classification Search
CPC ..... F02K 1/165; F05D 2270/17; B64D 33/02; B64D 2033/0226; B64D 2033/0293; F02C 7/04; F02C 7/045; F02C 7/057; F02C 7/047
See application file for complete search history.

(56) References Cited

U.S. PATENT DOCUMENTS 2,735,612 A * 2/1956 Hausmann .............. F01D 5/143
                                                                138/111
4,249,859 A * 2/1981 Benyi, Jr. ................ F01D 9/04
                                                                415/137
(Continued)

FOREIGN PATENT DOCUMENTS

EP        1942258 A2    7/2008
EP        1988266 A2    11/2008
(Continued)

OTHER PUBLICATIONS

Rapport de Recherche Preliminaire / Opinion Ecrite, dated Sep. 29, 2016, issued in corresponding French Application No. 1561029 filed Nov. 17, 2015, 7 pages.

*Primary Examiner* — Steven M Sutherland
*Assistant Examiner* — Thuyhang N Nguyen
(74) *Attorney, Agent, or Firm* — Christensen O'Connor Johnson Kindness PLLC

(57) ABSTRACT

Air intake duct for supplying air to a turbine engine gas generator, in particular an aircraft turbine engine, extending axially between the air intake and the gas generator and having a deflection which may cause shedding of the boundary layer formed by the air flow along the wall of the duct, wherein said air intake duct comprises a guiding element located in the duct and designed to guide the air along the wall of the duct to a portion having the deflection, said guiding element extending transversely to the direction of the flow of air and having at the ends thereof two end profiles that form a non-zero angle with the guiding element, said two end profiles being able to produce eddies in the air flow.

10 Claims, 3 Drawing Sheets

(51) Int. Cl.
*B64D 33/02* (2006.01)
*F02C 7/045* (2006.01)
*F02C 7/047* (2006.01)
*F02K 3/072* (2006.01)

(52) U.S. Cl.
CPC .............. *F02C 7/047* (2013.01); *F02K 3/072* (2013.01); *B64D 2033/0226* (2013.01); *B64D 2033/0293* (2013.01); *F05D 2220/323* (2013.01); *F05D 2270/17* (2013.01)

(56) References Cited

U.S. PATENT DOCUMENTS

| | | | | |
|---|---|---|---|---|
| 4,446,696 | A * | 5/1984 | Sargisson | F02C 6/206 60/226.3 |
| 4,765,135 | A * | 8/1988 | Lardellier | F01D 5/03 416/127 |
| 4,836,473 | A * | 6/1989 | Aulehla | B64C 21/00 244/130 |
| 8,257,036 | B2 * | 9/2012 | Norris | F01D 25/30 415/208.2 |
| 8,814,529 | B2 * | 8/2014 | Fiala | F01D 5/145 416/223 A |
| 2008/0164378 | A1 | 7/2008 | Owens et al. | |
| 2014/0234074 | A1 * | 8/2014 | Pouyau | F02K 1/386 415/1 |

FOREIGN PATENT DOCUMENTS

EP   2072779 A2   6/2009
FR   2951502 A1   4/2011

* cited by examiner

AIRCRAFT TURBINE ENGINE AIR INTAKE DUCT

FIELD OF THE DISCLOSURE

Embodiments of the present invention relate to the field of the flow of fluid along a surface having a significant deflection, and are directed to aircraft engine air intakes.

BACKGROUND OF THE DISCLOSURE

The function of a turbine engine air intake duct, in particular an aircraft turbine engine intake duct, is to guide the air from the air intake of the turbine engine to the gas generator. Some turbine engines, such as a turboprop engine or a non-ducted propeller engine (for example of the type having a counter-rotating doublet), can comprise an air intake in the turbine engine which has a different axis to the air intake in the gas generator that drives the propeller. Their axes can be offset. This is generally the case for a turboprop engine in which the axis of the propeller is itself offset with respect to that of the gas generator. This may also be the case in an engine having a counter-rotating doublet at the front of the engine. FIG. 1 shows a turbine engine of this type having two air intakes having axes offset with respect to that of the turbine engine. The air intake conduit thus comprises a region in which the air flow undergoes significant deflection.

In this case, the air intake duct comprises a relatively complex-shaped intermediary portion between the air intake and the gas generator, which portion optionally comprises a channel for discharging particles which forms a sink, extends substantially in the direction of the axis of the air intake in the nacelle and allows for foreign bodies to be discharged so that they do not get into gas generator.

Seen from the side, the intermediary portion has a general goose neck shape of which the upstream end is connected to the air intake in the nacelle and of which the downstream end is connected to the air intake in the gas generator by means of a supply channel. The supply channel is located radially inward with respect to the discharge channel, and the intermediary portion comprises a part for connecting one channel to the other. There are other types of air intake, each of these air intakes comprising a connecting part that forms a deflection of the air flow.

The function of the air intake duct is to supply the gas generator with air in the most homogenous manner possible. However, the complex shape of the aforementioned duct brings about distortions in the air flow that supplies the gas generator, which has a negative impact on the performance and operability of the turbine engine. Said distortion is substantially due to the shedding of air owing to the significant deflection of the air flow in the aforementioned intermediary portion.

A solution to this problem would be to incorporate vortex or eddy generators at the upstream end of the air intake duct in order to energize the boundary layer and reduce shedding. This could, for example, involve transposing passive devices that use means of producing eddies to control the shedding of air on turbine engine blades. FR 2976634, which is in the name of the present applicant, describes a device of this type. Unfortunately, it appears that this solution, though functional, would not be effective enough in this type of design. Indeed, the duct opens very widely in the region of the deflection, and the disturbances necessary for limiting shedding of the boundary layer cannot be provided by a device of this type.

Another solution known from the prior art comprises a system for actively controlling shedding of the boundary layer in air intake ducts having significant deflections. For example, there are known devices in which the air circulating in the duct is sucked up or air is injected at very high speeds. However, devices of this type are complex and require elements for circulating the air, by means of suction or blowing, to be installed in a compartment of the nacelle near to the duct.

To the knowledge of the present applicant, there exists no passive system having eddy generators that produce disturbances sufficient for limiting shedding of the boundary layer in air intake ducts that undergo significant deflections.

SUMMARY OF THE DISCLOSURE

The aim of several embodiments of the present invention is therefore to propose a system that makes it possible to reduce shedding of flows in the air intake duct in a targeted manner and thus to reduce the distortion in the region of the compressor whilst having the least possible impact on operability and efficiency.

Embodiments of the present invention propose an air intake duct which is intended for supplying air to the gas generator of a turbine engine, in particular an aircraft turbine engine, and which extends axially between the air intake and the gas generator and has a deflection that may cause shedding of the boundary layer formed by air flow along the wall of the duct, wherein said duct comprises a guiding element that is located in the duct and designed to guide air along the wall of the duct along at least one portion having the deflection, said guiding element extending transversely to the direction of the flow of air and having at the ends thereof two end profiles that form a non-zero angle with the guiding element, said two end profiles being able to produce eddies in the air flow.

Embodiments of the present invention thus propose a simple, effective and economical solution.

Embodiments of the present invention apply to any air intake that undergoes significant deflection that causes boundary layer shedding, such as in a turboprop engine or in a non-ducted propeller engine, of the type having a counter-rotating doublet, for example.

According to another feature, the guiding element has an aerodynamic aerofoil profile and has a pressure side and a suction side, the pressure side facing the portion of the wall having the deflection. In particular, the guiding element is, on the trailing-edge side thereof, parallel to the wall of the air intake duct in the portion thereof having said deflection.

According to an embodiment, the two end profiles extend on either side of the guiding element, both on the pressure side and the suction side. More particularly, the end profiles are substantially flat and are in the shape of a parallelogram in some embodiments.

Advantageously, but in a non-limiting manner, and in line with the shape of the air flow guided by the guiding element, the two end profiles are in parallel with one another. According to a variant, the two end profiles diverge between the leading edge of the guiding element and the trailing edge thereof.

In one embodiment of the present invention, the guiding element is attached to the wall by means of a support arm. Depending on the resistance required, the guiding element is held by, for example, a plurality of support arms.

Generally, the air intake duct is connected to a portion that forms a particle sink, said portion being located downstream of the guiding element.

Embodiments of the present invention also relate to an aircraft turboprop engine or an open rotor engine, comprising a duct, such as the one described above.

BRIEF DESCRIPTION OF THE DRAWINGS

Embodiments of the present disclosure will be better understood and other details, features and advantages of the invention will emerge from reading the following description given by way of non-limiting examples and with reference to the accompanying drawings, in which.

DETAILED DESCRIPTION OF THE DISCLOSURE

Figure 1:
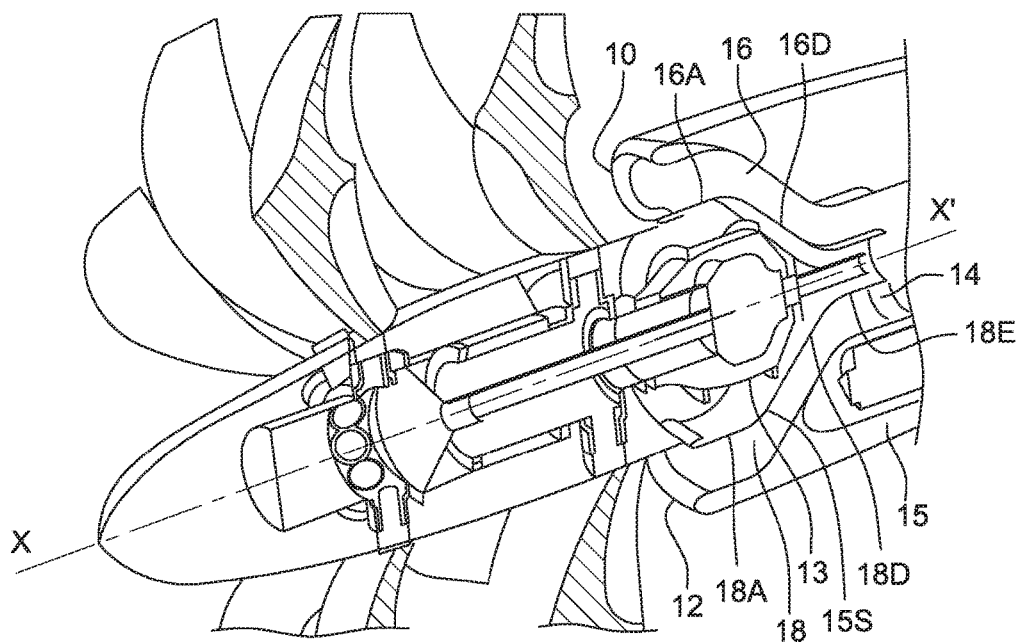
FIG. 1 is a cross section with a view of an open rotor engine showing the air intake duct.
Figure 2:
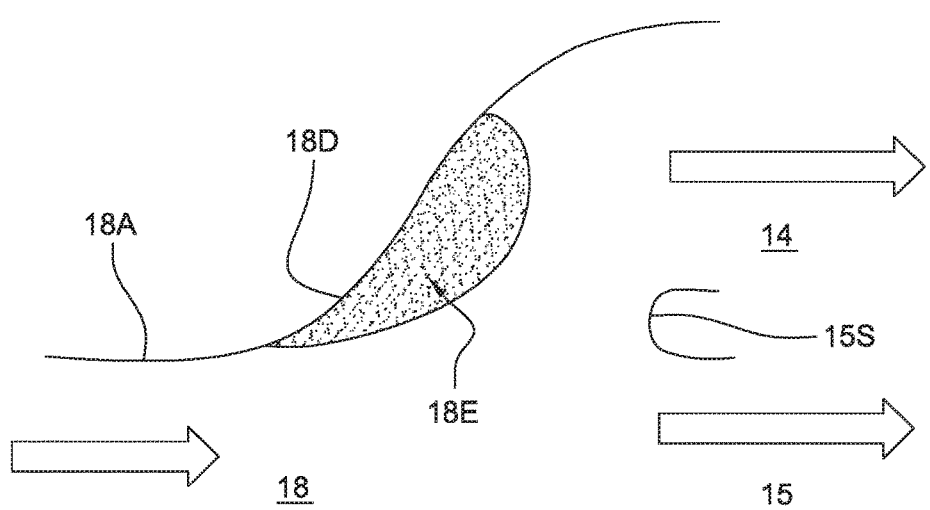
FIG. 2 is a diagram showing the phenomenon of shedding of the boundary layer at the point that the wall begins to deflect significantly.
Figure 3:
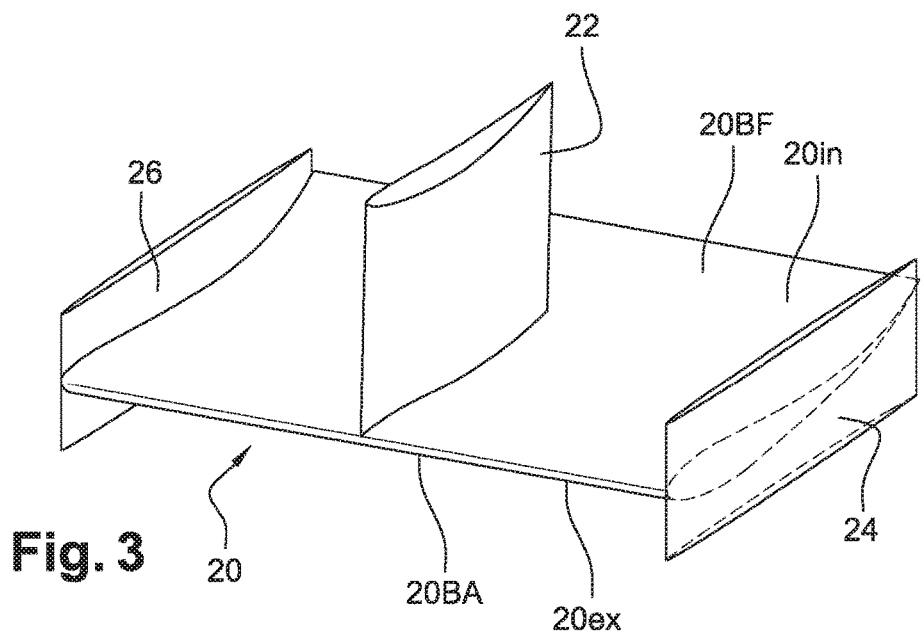
FIG. 3 is a perspective view of an air-guiding element according to one embodiment of the disclosure.

Reference will first be made to FIG. 1, which shows the front of an example open rotor engine in axial section with a front three-quarter view. The turbine engine comprises two counter-rotating propellers 11 at the front, driven by an engine located in the downstream extension of the axis of the propeller doublet 11. Immediately downstream, two air intakes 10 and 12 on the nacelle supply the gas generator (not shown in the figure) with air. The air intakes 10 and 12 are located on either side of the casing 13—above and below in this case—in which the mechanism for driving and controlling the propellers of the doublet 11 is accommodated. The intakes 10 and 12 communicate with two air intake ducts 16 and 18 having an oblong cross section. These two ducts 16 and 18 converge to a single annular channel 14 that is downstream of said casing 13 and forms the channel 14 for supplying the gas generator with air. Since the two intakes 10 and 12 are radially remote from the engine axis XX', the two conduits 16 and 18 have a radially sloped transition portion for joining the annular supply channel 14. As for the duct 18, the profile of the wall radially nearest to the axis therefore has a first portion 18A at a distance from the axis and then a portion 18D having a gradient oriented towards the axis and connecting to the portion 18E of the channel 14 for supplying the engine. The same applies to the air intake duct 16. Opposite said portion 18D of wall sloped towards the axis, the duct 18 widens owing to the presence of a sink for particles and foreign bodies. The air flow along the air intake duct 18 undergoes considerable deflection at this position, the particles taking an axial path towards the channel 15 of the sink. Note should be made of the partition 15S between the channel 15 and the channel 14 for supplying the gas generator. The aerodynamic conditions may cause shedding of the boundary layer along the wall as said wall goes from the portion 18A, which is parallel to the engine axis, to the sloped section 18D of the wall. Said shedding disturbs the flow and brings about distortions which affect the performance and operability of the downstream gas generator.

The solution according to aspects of the present invention is based on two results:

locally directing the fluid in order to reduce the impact of the change in direction of the duct 18; and introducing eddies to energize the fluid and thus further reduce shedding.

The fluid is directed by a guiding element 20 positioned in the duct 18, said element having a curved profile. As for the duct 18, this guiding element 20, shown in FIG. 3 to FIG. 6, is arranged at a distance from the wall in the region where said wall goes from the portion 18A to the portion 18D, at 12 o'clock, that is to say—as far as the duct 18 concerned—at the low point of the deflection. This guiding element 20 allows fluid to be guided in the desired direction. How far the guiding element 20 is inserted into the duct 18 is determined based on the design in question. The parameters taken into account are, in particular, the boundary layer, the air flow rate and the position of the shedding. The horizontal extension of the element 20, in the transverse direction, that is to say the width thereof, is determined by the size of the shedding.

The eddies are obtained by profiles 24 and 26 that are arranged at the transverse ends of the guiding element 20 and are perpendicular to said element. Thus, when the air flow sweeps across the guiding element 20, eddies appear at its transverse ends and energize the flow of fluid, which has first been suitably directed by the guiding element 20. Two results are thus combined: redirecting and energizing.

Compared with the known vortex generators, such as those described in FR 2676634, the arrangement of the guiding element 20 produces two eddies at the transverse ends, whereas the known vortex generator produces just one. The profiles 24 and 26 at the ends of the guiding element are, for example, formed from mere plates that are preferably aerodynamically streamlined in order to limit their impact on the incoming air flow. In the example shown in FIG. 3, the plates form a parallelogram.

Figure 4:
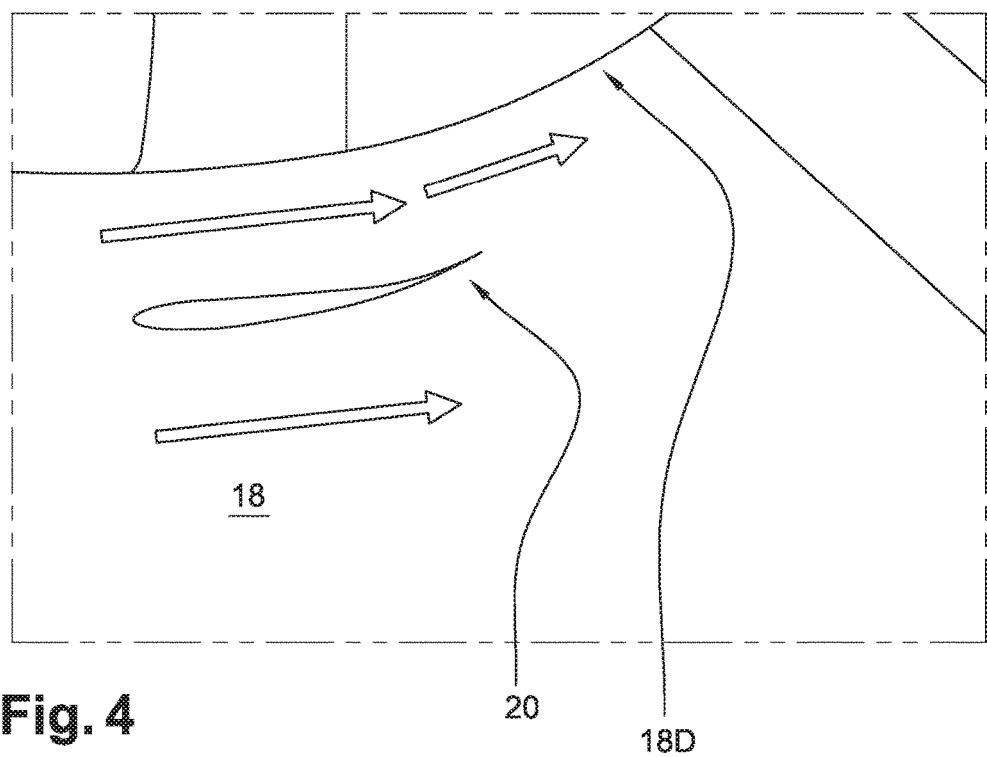
FIG. 4 and FIG. 5 are profile views of the guiding element in FIG. 3, positioned in the air intake duct of a turbine engine.

The body of the guiding element 20 preferably has an aerofoil profile having a leading edge 20BA and a trailing edge 20BF and a pressure side 20in and an opposite, suction side 20ex therebetween. The pressure side is arranged so as to face the portions 18A and 18D of the wall of the duct 18. The guiding element 20 is attached to the portion 18A of the wall of the air intake duct 18 by means of an arm 22. Depending on the aerodynamic forces to which the guiding element is subjected, it may be appropriate to provide a plurality of support arms. FIG. 4 shows the guiding element 20 positioned in the duct with respect to the wall, with the support arm and the profiles having been concealed. It should be noted that the portion of the guiding element 20 towards the trailing edge 20BF is preferably parallel to the sloped portion 18D.

Figure 5:
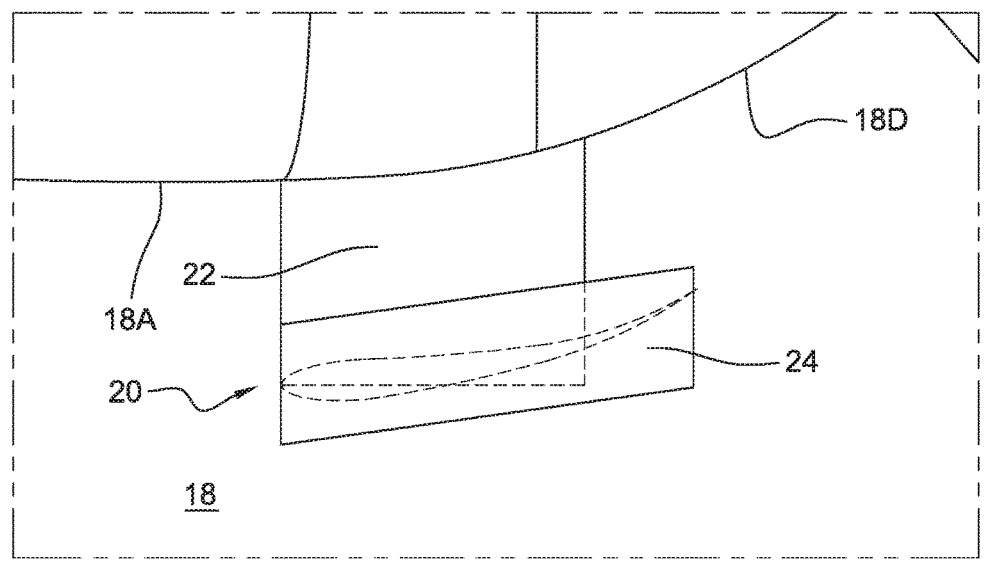
Figure 6:
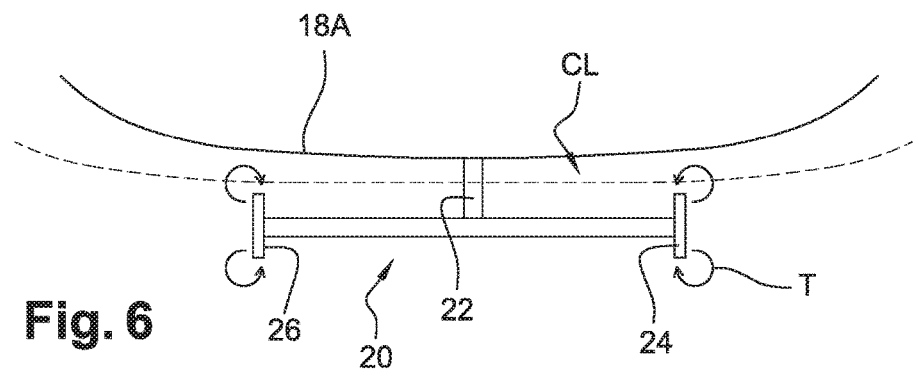
FIG. 6 is a schematic front view of the air intake duct according to one embodiment of the disclosure, together with the guiding element.

It has been noted that, without the end profiles 24 and 26, eddies at the ends of the guiding element grow in intensity, which has the effect that momentum, and therefore energy, is transferred outwards from the region of flow near to the wall. This transfer of energy has a destabilizing effect on the boundary layer and renders the guiding element 20 less effective. The arrangement of the end profiles reduces the intensity of these disturbing eddies and, in contrast, promotes the production of eddies that cause energy to be transferred in the desired direction. FIG. 5 indicates the rotational direction of the eddies caused by the end profiles.

Figure 7:
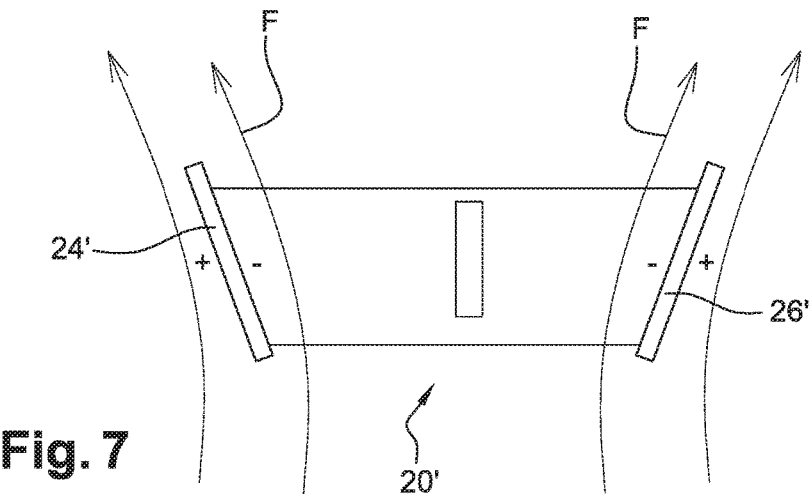
FIG. 7 shows a variant of the shape of the guiding element according to one embodiment of the disclosure.

The intensity of the eddies produced by the end profiles 24 and 26 is directly linked to the pressure difference between the pressure side and the suction side of the guiding element. Said pressure difference is controlled by the shape and direction of the end profiles 24 and 26 with respect to the local flow. FIG. 7 shows an example of rectangular end profiles 24' and 26' directed at a non-zero angle with respect to the flow so as to produce the desired pressure difference. One side of the vertical fin is "windward" (positive pressure—"+" symbol) and the other is "leeward" (negative pressure—"−" symbol). A pressure delta is thus obtained. This pressure difference will seek to balance out by producing an eddy (natural phenomenon), which is used here to re-energize the boundary layer.

Various solutions set forth herein may apply to the air intake duct 18 as described in FIG. 1, and/or apply to the air intake duct 16.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An air intake duct for supplying an air flow to a turbine engine gas generator, and extending axially between an air intake and said turbine engine gas generator, the air intake duct comprising:
   a deflection configured to cause shedding of a boundary layer formed by said air flow along a wall of said air intake duct; and
   a guiding element located in said air intake duct and having first and second ends, the guiding element configured to guide said air flow along a portion of the wall of said air intake duct having the deflection, said guiding element:
      extending transversely to the direction of said air flow;
      having an aerofoil profile with a pressure side and a suction side, the pressure side facing the portion of the wall having the deflection and said pressure side being attached to the wall of the air intake duct by at least one support arm,
      wherein the first and second ends having first and second end profiles, respectively, that each form a non-zero angle with the guiding element, each of said first and second end profiles extending from the guiding element on the pressure side and the suction side radially into said air flow, and configured to produce eddies in said air flow.

2. The air intake duct according to claim 1, wherein the first and second end profiles are substantially flat and are shaped as a parallelogram.

3. The air intake duct according to claim 2, wherein the first and second end profiles are in parallel with one another.

4. The air intake duct according to claim 2, wherein the first and second end profiles diverge between a leading edge of the guiding element and a trailing edge thereof.

5. The air intake duct according to claim 2, wherein the first and second end profiles diverge between a leading edge of the guiding element and a trailing edge thereof.

6. An aircraft turboprop engine, comprising an air intake duct according to claim 1.

7. An air intake duct for supplying an air flow to a turbine engine gas generator, said air intake duct extending axially between an air intake and said turbine engine gas generator, the air intake duct comprising:
   a wall that includes a wall portion having a deflection which causes shedding of a boundary layer formed by said air flow along the wall; and
   a guiding element located in said air intake duct and having an aerofoil profile with a pressure side and a suction side, the pressure side facing the portion of the wall having the deflection and said pressure side being attached to the wall of the air intake duct by at least one support arm, said guiding element configured to guide said air flow along the wall portion having the deflection,
   wherein said guiding element extends transversely to the direction of said air flow and said guiding element having at ends thereof first and second end profiles, respectively, that form a non-zero angle with said guiding element, said first and second end profiles extending from the guiding element on the pressure side and the suction side radially into said air flow and configured to produce eddies in said air flow.

8. The air intake duct of claim 7, wherein the guiding element is axially positioned in the air intake duct in the vicinity of the wall portion having the deflection.

9. An air intake duct for supplying an air flow to a turbine engine gas generator, and extending axially between an air intake and said turbine engine gas generator, the air intake duct comprising:
   a deflection configured to cause shedding of a boundary layer formed by said air flow along a wall of said air intake duct; and
   a guiding element located in said air intake duct and having first and second ends, the guiding element configured to guide said air flow along a portion of the wall of said air intake duct having the deflection, said guiding element:
      extending transversely to the direction of said air flow;
      having an aerofoil profile with a pressure side and a suction side, the pressure side facing the portion of the wall having the deflection and said pressure side being attached to the wall of the air intake duct by at least one support arm,
      wherein the first and second ends having first and second end profiles, respectively, that each form a non-zero angle with the guiding element, each of said first and second end profiles extending from the guiding element on the pressure side and the suction side, and configured to produce eddies in said air flow, and
      wherein the first and second end profiles are substantially flat and are shaped as a parallelogram.

10. The air intake duct according to claim 9, wherein the first and second end profiles are in parallel with one another.

* * * * *